US006985296B2

(12) United States Patent
Lipton et al.

(10) Patent No.: US 6,985,296 B2
(45) Date of Patent: Jan. 10, 2006

(54) NEUTRALIZING DEVICE FOR AUTOSTEREOSCOPIC LENS SHEET

(75) Inventors: Lenny Lipton, Greenbrae, CA (US); William James McKee, Jr., Tiburon, CA (US); Bruce A. Dorworth, Vacaville, CA (US)

(73) Assignee: StereoGraphics Corporation, Beverly Hills, CA (US)

( * ) Notice: Subject to any disclaimer, the term of this patent is extended or adjusted under 35 U.S.C. 154(b) by 10 days.

(21) Appl. No.: 10/826,556

(22) Filed: Apr. 15, 2004

(65) Prior Publication Data

US 2005/0018304 A1  Jan. 27, 2005

Related U.S. Application Data

(60) Provisional application No. 60/462,871, filed on Apr. 15, 2003.

(51) Int. Cl.
  *G02B 27/10* (2006.01)
  *G02B 27/22* (2006.01)
  *G09G 5/00* (2006.01)

(52) U.S. Cl. .............. 359/619; 359/620; 359/621; 359/622; 359/623; 359/463; 345/4; 345/9

(58) Field of Classification Search ........ 359/619–623, 359/626, 455, 458, 462, 463, 599; 345/1.1, 345/1.2, 1.3, 2.2, 4–9; 349/11–15, 59; 348/42, 348/59; 347/171
See application file for complete search history.

(56) References Cited

U.S. PATENT DOCUMENTS 5,500,765 A * 3/1996 Eichenlaub ............... 359/463
6,133,928 A * 10/2000 Kayashima et al. ........ 347/171

\* cited by examiner

*Primary Examiner*—Georgia Epps
*Assistant Examiner*—Jack Dinh
(74) *Attorney, Agent, or Firm*—Jeffer, Mangels, Butler & Marmaro LLP.

(57) ABSTRACT

A neutralizing sheet for an autostereoscopic image viewing system. The image viewing system includes a lenticular sheet covering a display screen. The neutralizing sheet including a pliable portion and is movable between a first position and a second position. The pliable portion has a refractive index similar to the lenticular sheet. When pressed into the lenticular sheet to define the first position, the pliable portion deforms to assume the shape of the lenticular sheet. Thus, refraction through the lenticular sheet is neutralized and viewing of planar images is enabled. In the second position, the neutralizing sheet is separated from the lenticular sheet and viewing of stereoscopic images is enabled.

7 Claims, 3 Drawing Sheets

NEUTRALIZING DEVICE FOR AUTOSTEREOSCOPIC LENS SHEET

This application claims the benefit of provisional application Ser. No. 60/462,871, filed Apr. 15, 2003.

BACKGROUND

The flat panel display, because of its physical characteristics, has lead to considerable interest in stereoscopic displays that do not require individual selection devices. These autostereoscopic displays use a selection device at the plane of the flat panel display screen rather than special glasses worn by every observer. Such means, be it a lenticular sheet (also known as a lenticular screen, lens sheet and lens screen—terms that are used interchangeably in this disclosure) or a raster barrier, have the disadvantage of making it difficult to see finely detailed image structure, like text, when the display is functioning in the planar mode. For this reason, inventors have sought ways to make a display functional in both the autostereoscopic and planar modes. These techniques invariably require switching back and forth between the two modes to, in effect, neutralize (and conversely reactivate) the refractive or barrier effect of the selection device.

Suggestions have been chronicled in the prior art involving various and occasionally interesting means, and one, at least, has been put into production for use as a novelty in cell phones in Japan. Such means have various defects. For example, those using lens sheets may require an additional screen of some sort to neutralize the lens sheet, or the lens sheet itself must be added or removed from the monitor. Until now, no suitable means has been described to elegantly and seamlessly switch between planar and stereo modes for a lens sheet selection device. The goal is to find a means that is transparent or totally unobtrusive to the user.

A liquid crystal shutter with a raster barrier, addressed like the alphanumerics in instrument displays, can be used in front of the display screen. Denying or applying power to the shutter can add or eliminate the barrier. While the simplicity of such a switchable raster barrier shutter is appealing, the cost of the liquid crystal shutter is a considerable fraction of the cost of the flat panel display itself. In addition, the raster pattern is visible, which coarsens the image in the autostereoscopic mode. Further, a liquid crystal shutter, because of the polarizers that are used, will reduce light in both the autostereoscopic and in the planar mode. In addition, in the autostereoscopic mode, it's understood that raster barriers have what optical engineers call low étendue. In plain English—the display is dim.

Nonetheless, the appealing thing about a switchable raster barrier is that it is a solution that is transparent to the user, stereoscopic image quality notwithstanding. A simple push of a button or a software call can switch the unit from the stereo to the planar mode.

For the lens sheet, no one has been able to figure out a similar user-transparent approach. Below we describe this hitherto undisclosed invention.

BRIEF DESCRIPTIONS OF THE INVENTION

In the present invention, an outward-facing lens sheet is applied in close juxtaposition to a flat panel display surface. Lens sheets of this kind have been well described in the art, for example in U.S. Pat. No. 1,128,979 to Hess. Postcards, novelties and other items have been made using these corduroy-like lenticular devices. The lenticules are typically vertical-going, that is, the lenticules meet to form boundary lines, and these boundary lines are usually parallel to the vertical edge of the display. There is a variation that was invented by Winnek and described in U.S. Pat. No. 3,409,351, in which the lenticular boundaries are tipped as some angle relative to the vertical, and there is nothing in the description below precluding the use of either vertical or tipped embodiments.

Our means for switching between the stereo and planar states involves an additional neutralizing device or cell that, in its neutralizing position, is pressed into intimate juxtaposition with the lenticular sheet. This neutralizing sheet is made up of a soft elastic transparent material, like silicone rubber, which is bonded to an outer plane surface substrate that is rigid, and this rigid plane surface is closest to and faces the observer. When the elastic material is clamped into place against the lenticular surface, it fills in the interstices of the lenticular sheet. The soft material has an index of refraction that closely matches that of the lens sheet. The combination of the lens sheet and the compressed soft material becomes an ensemble that has non-refractive properties. In point of fact, any sheet of transparent material with plane surfaces parallel to each other must have refractive properties especially for oblique rays. Thus, one may more accurately state that the combination of lens sheet and the neutralizing plate becomes identical to a cover glass and ceases to function as an autostereoscopic selection device.

Therefore, when the neutralizing device is pressed into contact with the lens sheet the autostereoscopic effect is neutralized because the refractive properties of the aggregate lenticules are neutralized. Once the pressure is released and the neutralizing device is held away from the lenticules the elastic material returns to its relaxed or plane surface orientation because the negative-going lenticular impressions are relaxed or disappear due to the restoring elastic forces of the material. The neutralizing ensemble then functions as a cover glass some small distance away from the lens sheet.

As we shall see in some detail below, this invention is a neutralizing device that provides a means for obviating the optical effects of the lens sheet refracting surface. The neutralizing device is placed in contact and pressed against the lens sheet's optical surface. The soft elastic material molds itself to fill in the surface of the lens sheet thereby defeating its refractive effect.

DETAILED DESCRIPTION OF THE INVENTION

Figure 1:
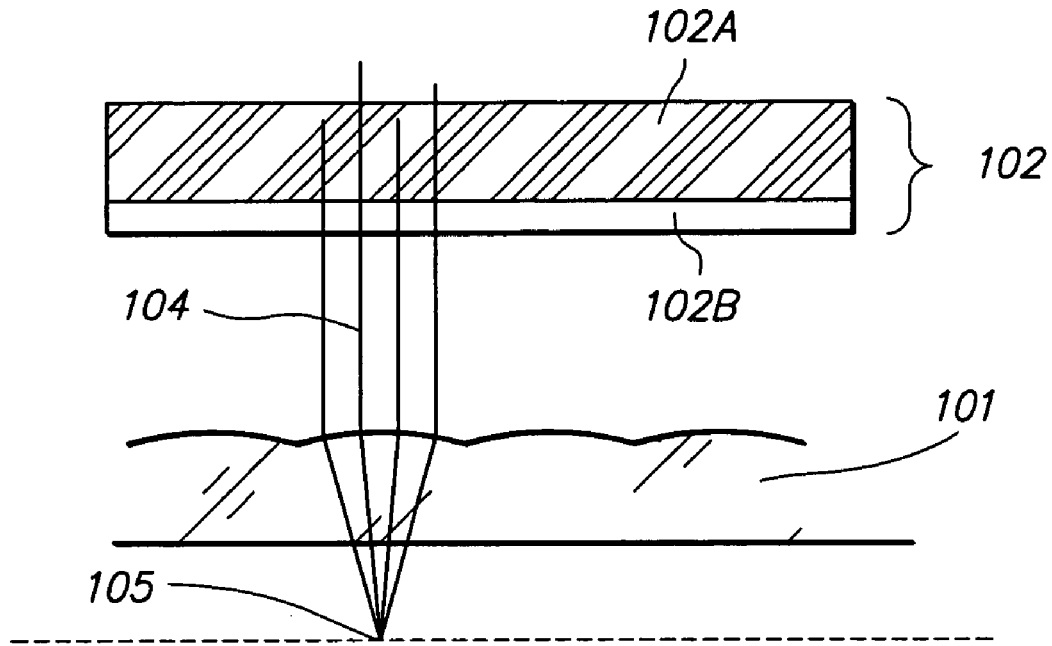
FIG. 1 is a cross-sectional view of the light rays passing through the neutralizing sheet and lenticular screen in the autostereoscopic position.

FIG. 1 is a cross-sectional view of an image viewing system having a neutralizing device 102 held in close proximity to a lenticular screen or lens sheet 101. In this embodiment, the lens sheet 101 is has outward facing lenticules or lenslets, i.e. the convex surfaces are facing toward the observer. Because there is a separation between the neutralizing device 102 and the lenticular screen 101, this embodiment of the viewing system operates in an autostereoscopic mode, wherein stereoscopic images are presented Incoming parallel light rays 104 are brought to focus at focal plane 105 (dotted line). In this example, the focal plane 105 is beyond the physical lens sheet itself, but in some cases the focal plane may be coincident with the rear surface of the lens sheet given the appropriate optical formulation and lens sheet thickness.

The light rays 104 pass through an optical neutralizing device 102, also called a neutralizing sheet, screen, or cell. The optical neutralizing device 102 is comprised of a rigid transparent substrate 102a, to which is bonded a soft and pliable transparent layer 102b. The transparent substrate sheet 102a has parallel plane surfaces and is used to provide a means to retain the shape of and to support the pliable layer of uniform thickness 102b. The pliable layer 102b is transparent with an index of refraction similar to that employed for the lens sheet 101, providing little, if any, distortion and attenuation to any light rays 104 passing through it. It is preferred that the substrate be fabricated to achieve similar characteristics. The pliable portion 102b of the cell may be formed and adhered to the transparent substrate 102a directly using well known techniques, or the pliable portion 102b may be a gel contained within a thin flexible transparent membrane to aid in holding it in position and to keep it free from contamination.

Figure 2A:
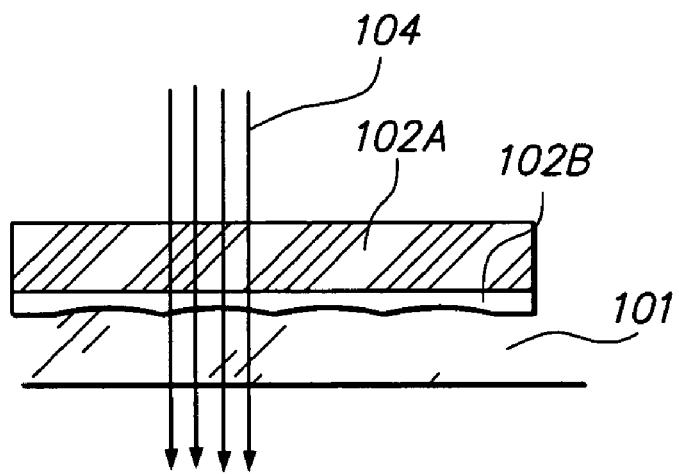
FIG. 2a is a cross-sectional view of the light rays passing through the neutralizing sheet and lenticular screen in the planar position.

FIG. 2A is a cross-sectional view of the image viewing system in the planar viewing mode. In this mode, the pliable layer 102b is pressed against the lenticular surface of lens sheet 101. The light rays 104 pass through the combination of the transparent substrate 102a, the deformed pliable layer 102b, and lenticular screen 101. Note that the transparent substrate 102a has an outer planar surface, thereby providing a clear, non-distorting optical path. The pliable layer 102b has been deformed to match the curved surface of the lens sheet 101 and to fill in the interstices of that curved surface. The refraction normally imparted by the lenticular screen has thus been neutralized because the pliable layer 102b has filled in the outer curved surfaces of the lens sheet 101. The pliable nature of layer 102b allows it to assume the negative-going form of the lenticular surface and fill in the corduroy-like surface to result in a combination of pliable layer 102b and lenticular screen 101 without refractive properties.

Figure 2B:
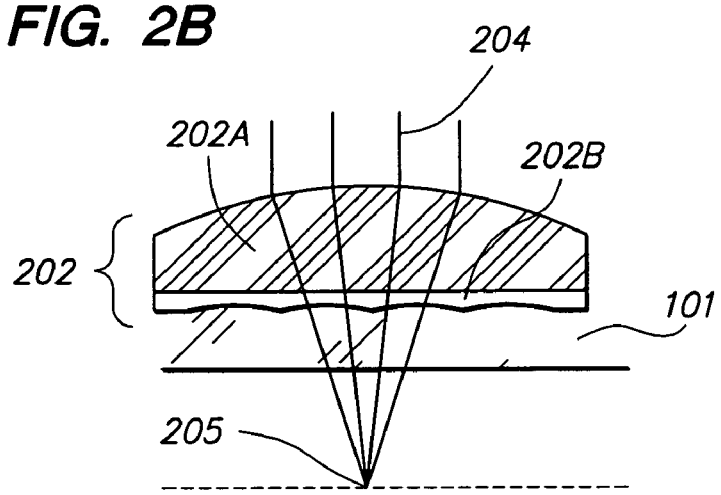
FIG. 2b is a cross-sectional view of the light rays passing through the neutralizing sheet, with added refraction capability, and lenticular screen in the planar position.

In FIG. 2B, the lenticular screen 101 is shown with a neutralizing sheet 202 pressed against it, as described above. However, in this embodiment, the transparent substrate 202a has a top surface that is formed in a lens-like shape, and since it is comprised of a refractive material, it imparts a lens-like effect to the light rays 204, bringing them to a focal point 205, as shown. This focal plane 205 is depicted only by way of example—other optical effects may be imparted. It follows that such a neutralizing cell or device can be used as a means not only to negate the original refractive effects of the lens sheet, but also to replace it with a different optical effect as may be desired, which is further elaborated in FIG. 4B as will be described shortly.

Figure 3:
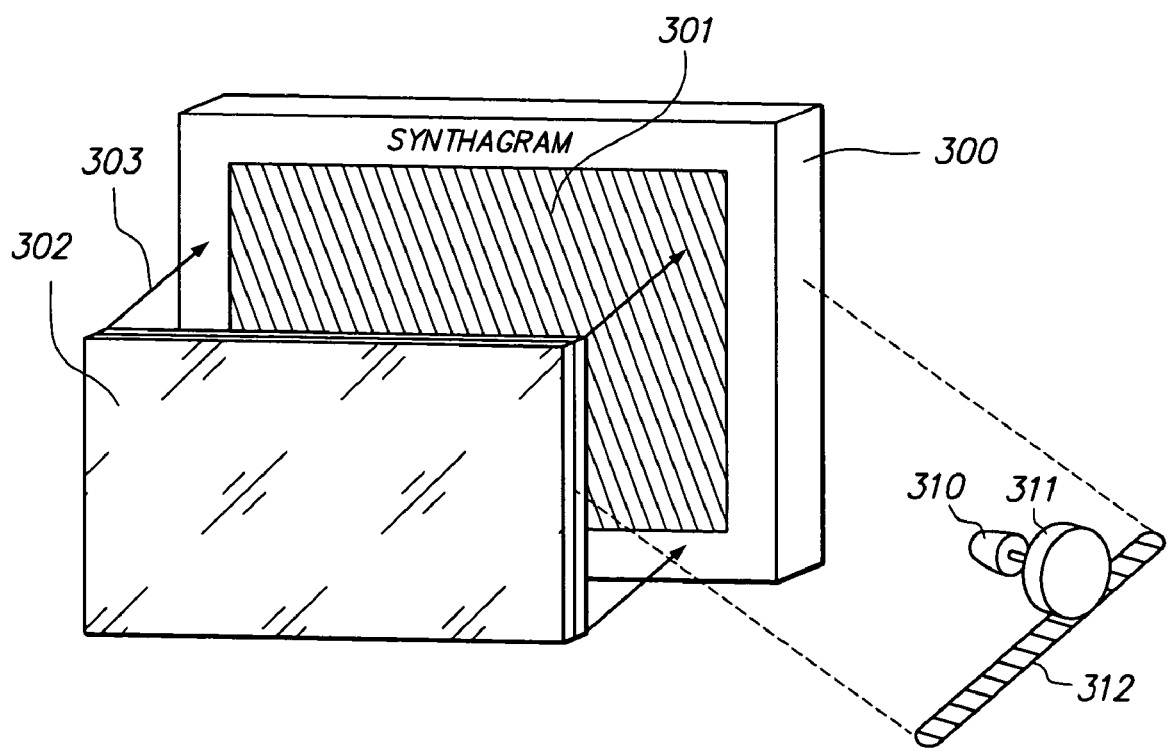
FIG. 3 is a perspective-view showing the movement of the neutralizing sheet relative to the lenticular screen and flat panel display surface.

Referring to the diagrammatic perspective view of FIG. 3, a flat panel display device 300 has a front surface lenticular screen 301 to produce the desired autostereoscopic effect. When the user of such a display prefers to neutralize the autostereoscopic effect by turning the display into a standard planar display, the neutralizing cell 302 is pressed against the lenticular surface, as indicated by arrows 303. When the neutralizing sheet 302 is in place, it effectively negates or neutralizes the refractive effect of the lenticular sheet 301 as taught above.

While is it contemplated that the neutralizing device may be a separate unit that is pressed against the lens sheet, a more convenient and preferred embodiment is to mount the optical neutralizing device at some small distance from the surface of the lens sheet, so that it remains in front of and is parallel with the surface of the display. Then, a simple mechanical means, such as an actuator, may be used to press the neutralizing sheet into place to obtain the desired optical neutralization. For example, a simple stepper motor 310 could be used to drive a gear 311 along a ratchet assembly 312 affixed between the neutralizing screen 302 and the display device 300 in a well known arrangement. Numerous other conventional mechanical and electro-mechanical solutions are known for such an application. The neutralizing cell must be moved some short distance so that it can be brought into firm contact with the lens sheet surface to provide a planar viewing mode, and the inverse function must also be performed to restore the display to the autostereoscopic mode.

One of the hallmarks of this invention is that the change between autostereo and planar modes can be accomplish rapidly and with little or no effort on the part of the user. The movement of the neutralizing device 302 along the path of the arrows 303 can be accomplished manually or electrically.

Figure 4A:
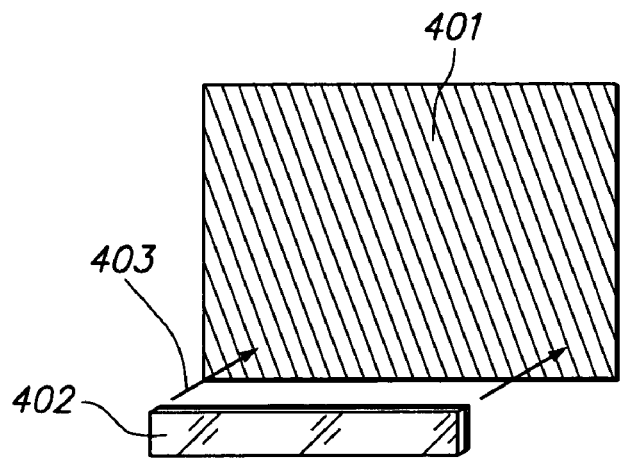
FIG. 4a shows a neutralizing sheet for treating an area of the lenticular screen.

With reference to FIG. 4A, a lenticular sheet 401 may be rendered planar-in-part, to coin a phrase, by the use of a neutralizing cell 402 pressed against a portion of the surface as shown by directional arrows 403 so that it covers only a small portion the original screen. This will allow the user of such a display to clearly see screen information that may be desirable, for example, in viewing a text message.

Figure 4B:
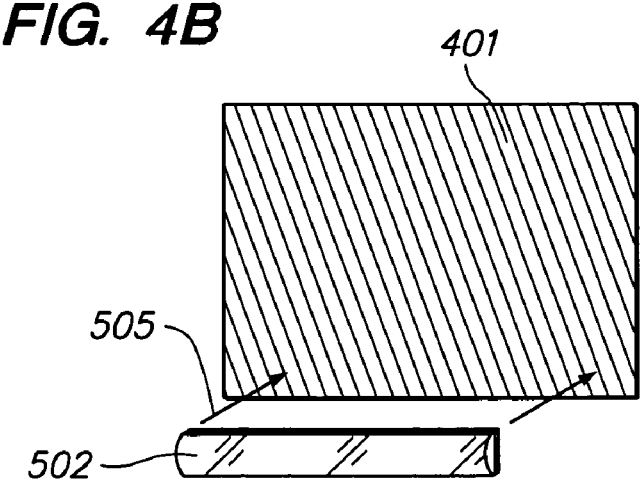
FIG. 4b shows a neutralizing sheet with a magnifying optical surface for treating an area of the lenticular screen.

With reference to FIG. 4B, the optical surface 401 is again partly neutralized by application of the cell 502 by movement in the direction given by arrows 505. However, in this case the cell 502 is fabricated with its own optical element, for example, similar to the well known Franklin magnifier, so as to aid in viewing small text.

We have described a simple and unique optical means to neutralize the effect of a lenticular sheet so that the user may rapidly switch as desired between stereoscopic and planar viewing modes. The means described are simple and low cost to fabricate, and the straightforward design will produce a robust product, without the requirement of costly calibration, since the device is intrinsically self-calibrating.

What is claimed is:

1. An image viewing system, comprising:
   a lenticular sheet, and
   a neutralizing sheet having a pliable portion, said neutralizing sheet being movable between a first position, wherein the neutralizing sheet is pressed into intimate juxtaposition with the lenticular sheet such that the pliable portion deforms to assume the shape of the lenticular sheet, and a second position, wherein the neutralizing sheet is separated from the lenticular sheet.

2. An image viewing system as in claim 1, wherein an actuator moves the neutralizing sheet between the first position and the second position.

3. A neutralizing sheet for an autostereoscopic image viewing system, wherein the system includes a lenticular sheet covering a display screen, comprising:
   a neutralizing sheet including a pliable portion and movable between a first position and a second position, wherein the pliable portion has a refractive index similar to the lenticular sheet such that when pressed into the lenticular sheet to define the first position, the pliable portion deforms to assume the shape of the lenticular sheet to thereby neutralize the refraction through the lenticular sheet, and wherein the second position is defined to have the neutralizing sheet separated from the lenticular sheet.

4. A neutralizing sheet as in claim 3, wherein the pliable portion is affixed to a rigid substrate.

5. A neutralizing sheet as in claim 4, wherein the pliable portion is a soft transparent elastic material.

6. A neutralizing sheet as in claim 5, wherein the material is silicone rubber.

7. A neutralizing sheet as in claim 4, wherein the pliable portion is a gel contained within a thin flexible transparent membrane.

\* \* \* \* \*